US008886450B2

(12) United States Patent
Gates et al.

(10) Patent No.: US 8,886,450 B2
(45) Date of Patent: Nov. 11, 2014

(54) SYSTEM AND METHOD FOR IDENTIFYING MANOEUVRES FOR A VEHICLE IN CONFLICT SITUATIONS

(75) Inventors: David John Gates, Holder (AU); Elliot Ashley Gates, Holder (AU); Mark Westcott, Farrer (AU); Neale Leslie Fulton, Kambah (AU)

(73) Assignee: Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 1280 days.

(21) Appl. No.: 12/280,488

(22) PCT Filed: Feb. 20, 2007

(86) PCT No.: PCT/AU2007/000179

§ 371 (c)(1),
(2), (4) Date: Aug. 22, 2008

(87) PCT Pub. No.: WO2007/095671

PCT Pub. Date: Aug. 30, 2007

(65) Prior Publication Data

US 2009/0259402 A1 Oct. 15, 2009

(30) Foreign Application Priority Data

Feb. 23, 2006 (AU) ................................ 2006900884

(51) Int. Cl.

| | |
|---|---|
| ***G06F 17/10*** | (2006.01) |
| ***G08G 5/00*** | (2006.01) |
| ***G08G 3/02*** | (2006.01) |
| ***G08G 5/04*** | (2006.01) |

(52) U.S. Cl.

CPC ................ *G08G 5/0078* (2013.01); *G08G 3/02* (2013.01); *G08G 5/045* (2013.01)

USPC ................. 701/301; 701/14; 701/15; 701/16; 701/17; 701/302

(58) Field of Classification Search

None

See application file for complete search history.

(56) References Cited

U.S. PATENT DOCUMENTS

| | | | | |
|---|---|---|---|---|
| 6,021,374 | A | 2/2000 | Wood | |
| 6,043,757 | A * | 3/2000 | Patrick | 340/963 |

(Continued)

FOREIGN PATENT DOCUMENTS

| | | |
|---|---|---|
| DE | 198 12 037 | 9/1999 |
| JP | S61-073081 | 4/1986 |

(Continued)

OTHER PUBLICATIONS

Search Report and Written Opinion for PCT Application No. PCT/AU2007/000179, 8 pages, Apr. 30, 2007.

(Continued)

*Primary Examiner* — Fateh Obaid

(74) *Attorney, Agent, or Firm* — Brinks Gilson & Lione

(57) ABSTRACT

The present invention is directed to a system and method for identifying maneuvers for a vehicle in conflict situations. A plurality of miss points are calculated for the vehicle and as well as object conditions at which the vehicle will miss an impact with the at least one other object by a range of miss distances. The miss points are displayed such that a plurality of miss points at which the vehicle would miss impact by a given miss distance indicative of a given degree of conflict is visually distinguishable from other miss points at which the vehicle would miss impact by greater miss distances indicative of a lesser degree of conflict. The resulting display indicates varying degrees of potential conflict to present, in a directional view display, a range of available maneuvers for the vehicle in accordance with varying degrees of conflict.

21 Claims, 10 Drawing Sheets

(56) References Cited

U.S. PATENT DOCUMENTS

| | | | | |
|---|---|---|---|---|
| 6,054,937 | A * | 4/2000 | Von Viebahn et al. | 340/961 |
| 6,085,150 | A * | 7/2000 | Henry et al. | 701/301 |
| 6,604,044 | B1 * | 8/2003 | Kirk | 701/120 |
| 6,970,104 | B2 | 11/2005 | Knecht et al. | |
| 2004/0024528 | A1 | 2/2004 | Patera et al. | |
| 2004/0143393 | A1 | 7/2004 | Knecht et al. | |
| 2004/0181318 | A1 | 9/2004 | Redmond et al. | |

FOREIGN PATENT DOCUMENTS

| | | |
|---|---|---|
| JP | S62-117100 | 5/1987 |
| JP | S62-278700 | 12/1987 |
| JP | H03-041600 | 2/1991 |
| JP | H03-161899 | 7/1991 |
| JP | H03-208798 | 9/1991 |
| JP | 2005-61893 | 3/2005 |
| RU | 2131622 | 6/1999 |
| WO | WO 2001/025724 | 4/2001 |

OTHER PUBLICATIONS

Extended European Search Report for EP Application No. EP 07 70 1510, 6 pages, Dec. 28, 2009.

Robert L. Shaw, Fighter Combat: The Art and Science of Air-to-Air Warfare, pp. 10-14 (United States Naval Institute 1988) (8 pages).

Military Interface Standard MIL-STD-1787B: Aircraft Display Symbology, pp. 10, 28, 31-36, 42, 76, 100, 106-108, 113, 127 (Apr. 5, 1996) (17 pages).

Office Action in corresponding Japanese Patent Application No. 2008-5555564 dated Apr. 17, 2012 (with English Translation).

* cited by examiner

SYSTEM AND METHOD FOR IDENTIFYING MANOEUVRES FOR A VEHICLE IN CONFLICT SITUATIONS

This application is a filing under 35 U.S.C. §371 of International Patent Application PCT/AU2007/000179, filed Feb. 20, 2007, which claims priority to Australian application no. AU 2006900884, filed Feb. 23, 2006.

FIELD OF THE INVENTION

The present invention is directed to a system and method for identifying manoeuvres for a vehicle in conflict situations. The present invention has particular but not exclusive application to an aircraft display system to avoid mid-air collisions between aircraft, or conversely to intercept a threat in mid-air. Further, it will be appreciated that the invention may also be used in marine vessels for similar purposes.

As used herein the expression “vehicle” is not limited to conventional vehicles such as aeroplanes, ships, cars etc, but also includes uninhabited vehicles.

As used herein the expression “conflict situation” is to be given a broad meaning and refers to a situation in which the vehicle can conflict with another object in the sense of there being an impact or a close or near miss between the vehicle and the other object. The expression includes but is not limited to an impact by the vehicle, near misses, and threat interception.

As used herein the expression “condition” refers to various parameters associated with a vehicle or object. These include, but are not limited to, position (including altitude), bearing, heading, velocity, acceleration etc.

BACKGROUND OF THE INVENTION

Anti-collision systems in vehicles are known. Systems currently in use employ displays of the vehicle’s own region that are derivatives of systems based on inertial, radar, and sonar sensors, and provide a visual representation of the existence of another vehicle. Such systems provide limited information on how to optimally steer away from any potential conflict.

An example of a system currently used in aircraft is the Traffic Alert and Collision Avoidance System (TCASII). When a second aircraft, known as the intruder, is detected in the first aircraft’s onboard system, a warning signal is transmitted to the cockpit crew. This is known as a traffic advisory signal. The system then emits an audible and visual instruction for the pilot to either climb or descend. This is known as the resolution advisory signal.

A similar traffic advisory signal is received by the crew of the second aircraft if so equipped. However the resolution advisory instruction received at the second aircraft (if so equipped) is the opposite to that given to the first aircraft. The system therefore provides a suggestive manoeuvre (either climb or descend) to both aircraft to avoid a collision. Whilst there is a cockpit display for the system, it is quite cryptic and might not visually identify a second aircraft in the conflict region.

As discussed above, TCASII provides only a climb or descend option to the pilot to avoid the conflict. The pilot does not receive instruction to turn or change speed. Further, the TCASII system cannot adequately handle multiple aircraft in a potential collision zone.

Another prior art system for identifying conflicts is the air-to-air radar display. Such a display is usually used in fighter aircraft and is not implemented in civil vehicles. FIG. 1 shows the main features of the display that is primarily used to target enemy aircraft in air-to-air combat (Figure reference: Shaw, R. L., (1988) Fighter Combat The Art and Science of Air-to-Air Combat, Patrick Stephens Limited). When a target is out of range, the display simply directs the aircraft, or own-aircraft/ownship, on a collision course with the target. The pilot can achieve the required direction by steering the dot 100 so as to place it in the centre of the display.

The display of FIG. 1 is essentially a projection of the front rectangle of directions scanned by ownship’s sensors, such as radar. Thus a direction in 3D becomes a point in 2D on the display. The line of sight (LOS) 102 of the target becomes a point, which in this instance is represented by a square to differentiate from other symbols displayed to the pilot. The allowed steering error (ASE) circle 104 indicates a range of possible launching directions. That is, when the steering dot 100 lies inside the circle 104, a launch can be successful. The display may contain other information like time and distance to the intercept point (not shown). It will be appreciated that such a display can also act as a collision avoidance system, where the pilot simply steers ownship away from the target.

A further prior art system is disclosed in U.S. Pat. No. 6,970,104 to Knecht and Smith. Here, flight information is used to calculate a conflict region within a reachable region of ownship. The display gives an artificial three dimensional representation (heading, speed and altitude) of a conflict region to the pilot. The display does not show three dimensional positions relative to ownship, and only displays manoeuvre space in relation to the conflict region. That is, the pilot must identify a region away from the conflict region, calculate the required heading, speed and altitude from the display, then manoeuvre ownship in accordance with these calculations.

The conflict region of Knecht and Smith is calculated from assumptions about how both aircraft could turn, climb, descend, accelerate or slow down. Thus their conflict region requires both questionable assumptions and considerable processing of data, rather than incontrovertible information and the display of directly meaningful data.

Further, the pilot is not informed of the level of danger associated with the chosen heading, speed and altitude. The pilot might be placing own-aircraft into a future conflict situation if the conflict region is just beyond the chosen time horizon (look ahead minutes) and is therefore not displayed.

Therefore, there is a need to provide a display for a vehicle to immediately inform the pilot of the vehicle of a potential conflict situation, and provide an indication as to the inherent level of danger for potential manoeuvres of the vehicle.

SUMMARY OF THE INVENTION

The present invention aims to provide an alternative to known systems and methods for identifying desirable vehicle manoeuvres in conflict situations.

In general terms, in one aspect the present invention relates to a system and method of identifying manoeuvres for a vehicle in conflict situations involving the vehicle and at least one other object. A plurality of miss points are calculated for the vehicle and object conditions at which the vehicle will miss an impact with the at least one other object by a range of miss distances.

The miss points are displayed such that a plurality of miss points at which the vehicle would miss impact by a given miss distance indicative of a given degree of conflict is visually distinguishable from other miss points at which the vehicle would miss impact by greater miss distances indicative of a lesser degree of conflict. The resulting display indicates varying degrees of potential conflict to present in a directional view display a range of available manoeuvres for the vehicle in accordance with varying degrees of conflict.

One embodiment of the visually distinguishable pluralities of miss points are characterised by isometric mappings, and preferably colour bandings. In accordance with another embodiment of the invention, the directional view display is a monochrome display, or preferably a colour display.

In general terms, a further aspect of the invention resides in calculating other vehicle and object conditions whereby the displayed range of available manoeuvres is updated in accordance with changes to the conditions of the vehicle and other object. In a further preferred embodiment, the location of at least one collision point is calculated where the vehicle will impact the other object for given vehicle and object conditions. The at least one collision point is then displayed in the directional view display.

In general terms, another aspect of the invention relates to a method and system for avoiding a mid-air collision between two aircraft.

In a further embodiment of the invention, a navigation system for a vessel is described.

In general terms, in another aspect the present invention relates to a method for intercepting a moving object.

In a further embodiment, the present invention relates to logic embedded in a computer readable medium to implement the abovementioned systems and methods.

DETAILED DESCRIPTION OF THE PREFERRED EMBODIMENT OF THE INVENTION

Figure 1:
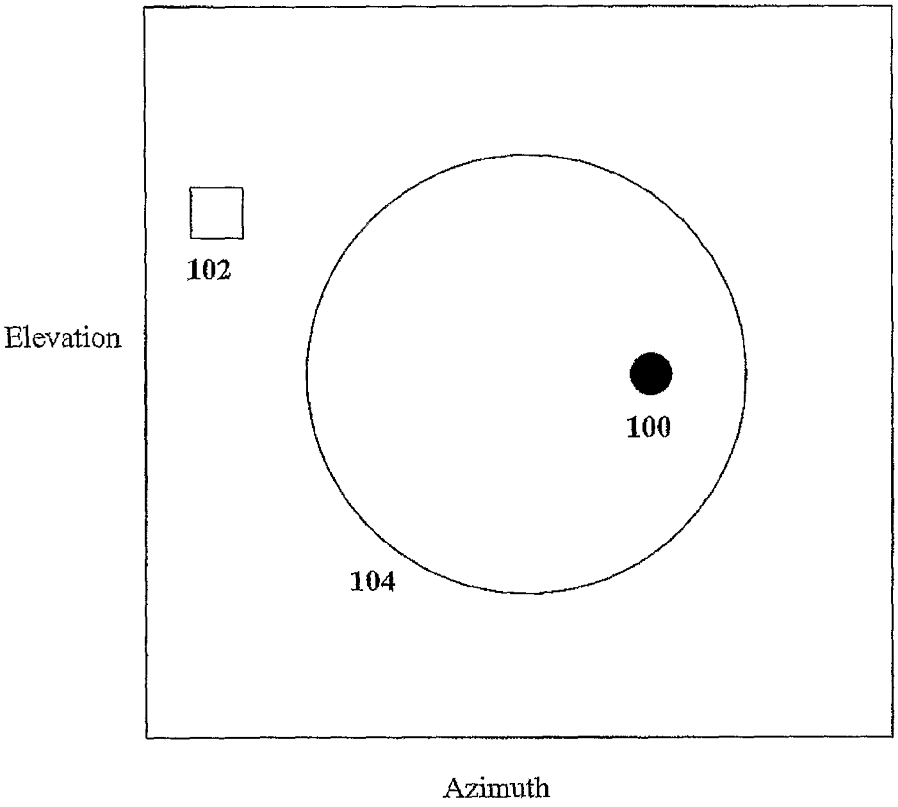
FIG. 1 is a prior art display system primarily used in air-to-air combat.
Figure 2A:
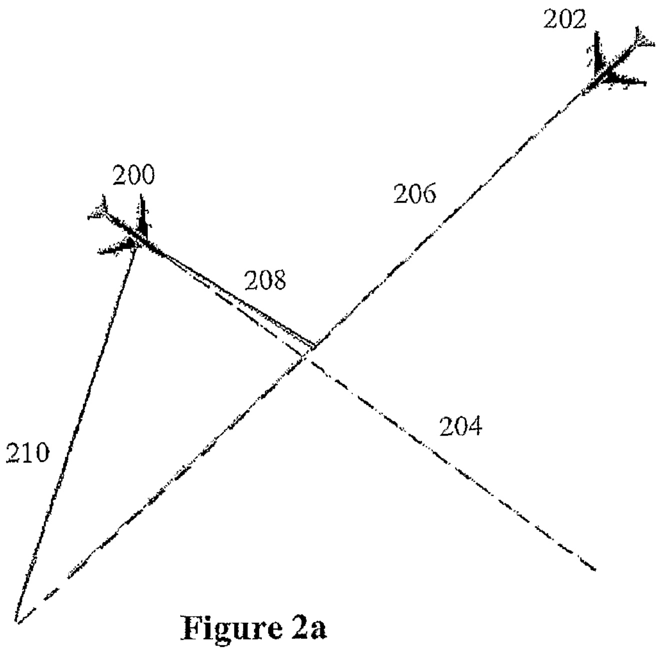
FIGS. 2*a* and 2*b* depict a potential conflict situation in relation to two aircraft.
Figure 2B:
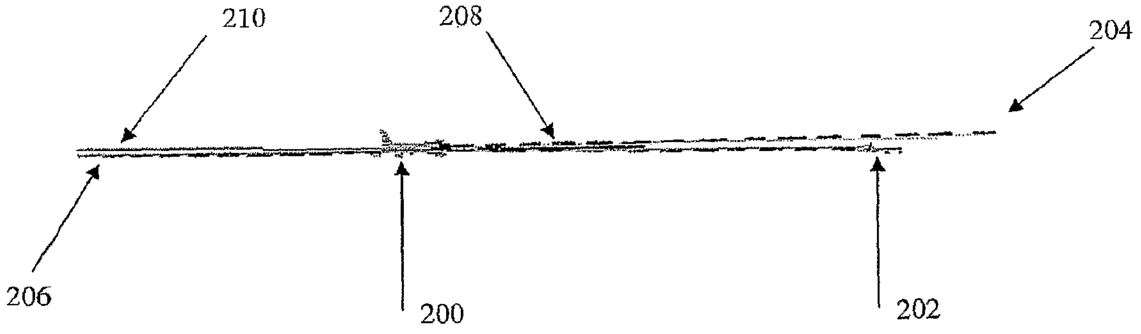
Figure 2C:
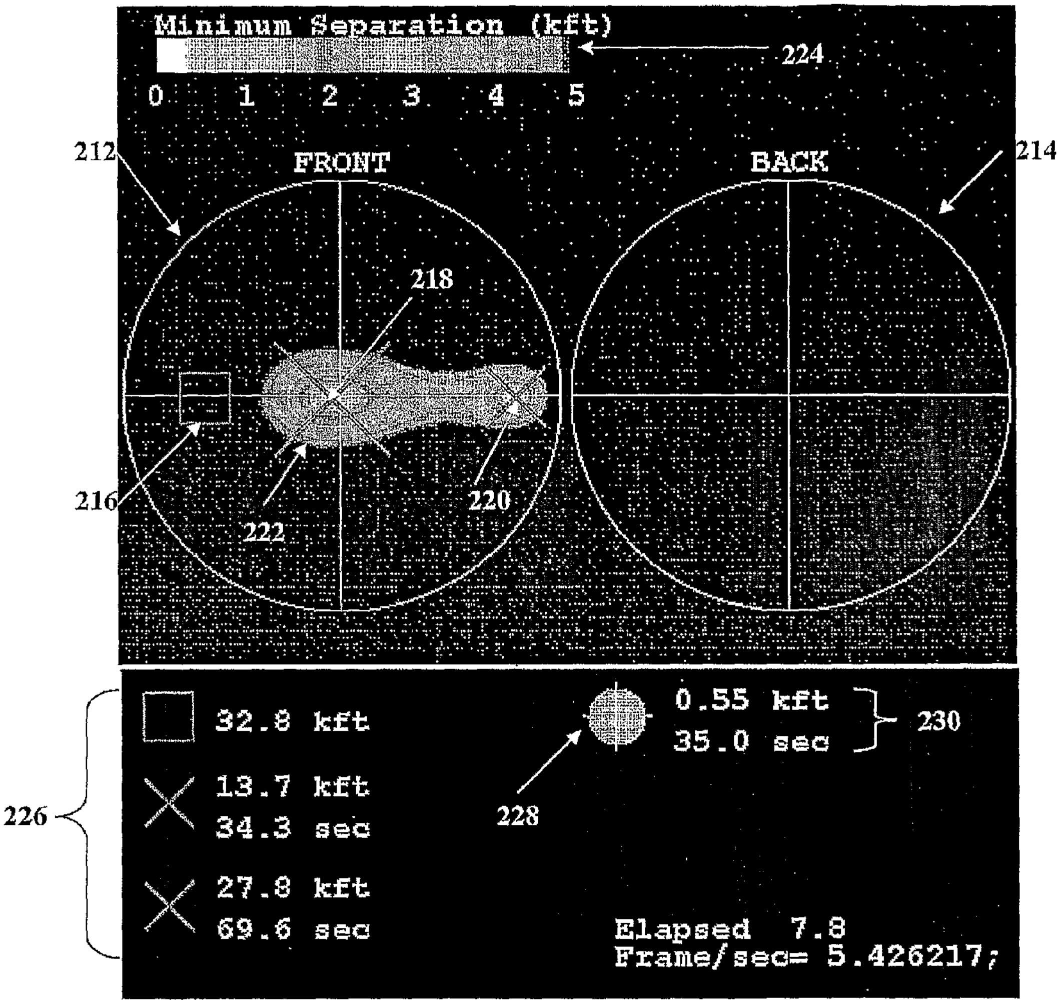
FIGS. 2*c* and 2*d* show a display in accordance with the present invention of the potential conflict situation of FIGS. 2*a* and 2*b*.

Turning now to a more detailed description of the present invention, FIGS. 2*a* and 2*b* depict two aircraft (own-aircraft 200, intruder 202) approaching a potential conflict situation. FIG. 2*c* shows a preferred cockpit display in accordance with the present invention, with reference to the situation shown in FIG. 2*a*.

The example situation shown in FIGS. 2*a* and 2*b* has the following parameters:

own-aircraft speed is 400 ft/s; and intruder speed is 780 ft/s.

Both aircraft 200, 202 are flying level and own-aircraft 200 is 200 feet higher than intruder 202. There is other traffic below (not shown) preventing a descent by either aircraft.

The top plan view of FIG. 2*a* shows a perspective scene. Dashed lines 204 and 206 show the direction of the current velocity vector of own-aircraft 200, and intruder 202 respectively. Solid lines 208 and 210 emanating from own-aircraft show the directions that would lead to a conflict situation. These lines are calculated on the basis that neither aircraft changes speed, and the intruder 202 continues with its current velocity vector 206.

There are two collision points because the intruder 202 is faster and the two aircraft are closing. Since aircraft position and velocity vectors change with time, the directions change dynamically. If the intruder 202 were slower than own-aircraft 200, there would be at most one collision direction.

FIG. 2*b* duplicates the same situation as described above, observed from the side.

FIG. 2*c* shows an example of a preferred display in accordance with the present invention. The left disc 212 is a zenithal projection of the front hemisphere of directions around own-aircraft, where the zenith is directly ahead. The right disc 214 is the rear hemisphere, which is included because a conflict situation could originate from a faster intruder behind own-aircraft.

The cross hairs are aligned with own-aircraft body axes. That is, the centre of the front projection corresponds to the longitudinal body axis of own-aircraft, or the pilot's viewpoint straight ahead. The centre of the rear projection is directly opposite, towards the rear of own-aircraft.

Equal radial angles in 3D, relative to the central directions, are represented as equal radial distances from the centres of the projections. The circumferences of the circles are at 90° from the centres, and both circles represent a ring centred on the pilot in a plane at right angles to the longitudinal axis.

The LOS, giving the direction of the intruder 202 from own-aircraft 200, is preferably shown as a square 216. The size of the square indicates the distance to the intruder, but its minimum size is preferably fixed. Collision points 218 and 220 are preferably represented as crosses. In similar regard to the intruder, the size of the collision points 218, 220 indicates the distance to the potential collision. The band surrounding the collision points define a conflict zone 222. The variations in shading inside the conflict zone are a representation of the miss distance, or future minimum separation, between own-aircraft and intruder for all hypothetical own-aircraft directions. That is, the variations in shading define degrees of conflict. Preferably, the shading is a degree of colours to allow the pilot to immediately associate a miss distance with a level of danger.

To further explain how the varying degrees of conflict are calculated, a hypothetical direction for own-aircraft is chosen. That is, the cross hairs are notionally positioned toward a desired direction, with existing speed. This is referred to as a miss point. Referring to FIG. 2*c*, should the intruder continue with its current velocity vector, a hypothetical miss distance may be calculated (discussed below) in relation to the miss point.

Preferably, a colour is chosen from the legend 224 appropriate for this miss distance, and a screen pixel is coloured accordingly at that miss point. Appropriate shading may be applied to indicate the degree of conflict if a colour display is unavailable. If the miss distance is calculated to be beyond the range of the legend 224—which is 5 kft in FIG. 2*c*—then the pixel, or miss point, is left black. Continuing with this algorithm, the miss distance may be calculated for a continuum of hypothetical own-aircraft directions, resulting in the displayed degree of conflict.

The varying degree of conflict inside the conflict zone allows the pilot to immediately evaluate a level of danger associated with any course that might be taken. Therefore, if the intention is to avoid the collision points, the pilot may steer the vehicle so as to ensure an adequate miss distance (immediately derived by the colour/shading associated with that miss point). If it is the intention to intercept the intruder, the pilot may steer the vehicle toward the collision point, evaluating the degree of conflict to assist with the direction for intercept.

Preferably, the display includes data information 226 to assist the pilot. A preferred embodiment of the invention as shown in FIG. 2*c* further includes, but is not limited to, the current distance of the intruder alongside its symbol, and the distance and time to the collision points. An immediate indication of the degree of conflict is also preferably shown in a separate representation 228. The time and distance to closest approach 230 may also be shown.

Although not shown, further data information preferably includes visual indications, such as arrows, representing the position of cross (i.e. above, below, left or right) of own-aircraft when passing the intruder. In addition, a numerical value $H_M$ of the vertical component representing the miss distance is preferably included when the position of cross is above or below the intruder. Also, a numerical value $W_M$ of the horizontal component of the miss distance may be included when the position of cross is to the left or right of the intruder. Consequently, the directions of the arrows, and value of the miss distance indicates how own-aircraft should steer to vary the degree of conflict depending on whether a conflict is to be avoided or the intruder is to be intercepted.

Figure 2D:
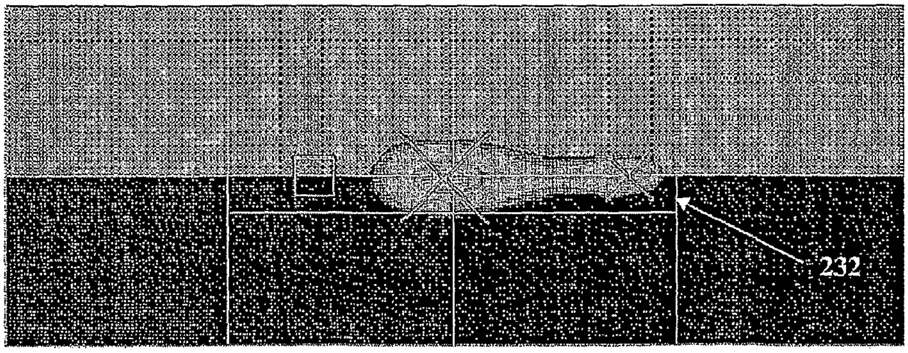

FIG. 2*d* shows another embodiment of the display and depicts a Mercator projection of the whole sphere. The flight situation shown here, is the same situation shown in FIG. 2*c*. In similar regard to FIG. 2*c*, the axes of the display are the axes of own-aircraft. Equal angles of azimuth are represented as equal horizontal distances. Equal angles of elevation are represented as equal vertical distances. The point exactly above own-aircraft, relative to its axes, is mapped onto the upper edge, so directions in this vicinity are greatly magnified and distorted. Similarly, the point exactly below own-aircraft is mapped onto the lower edge. This projection has the merit of continuity of front and rear projections, except for a vertical cut behind own-aircraft.

This display of FIG. 2*d* incorporates a projection of the horizon which, at this instant, is flat and level. Points above the horizon are preferably depicted in a different colour/shade to assist the pilot. As own-aircraft pitches up, the horizon appears to fall near the centre and to rise near the left and right edges (as seen in FIG. 3*d*). As own-aircraft banks in a turn, it tilts and adopts a sinusoidal shape. A horizon (not shown) could be added to the double hemisphere projection of FIG. 2*c*, if desired.

The inner window 232 of FIG. 2*d* approximates a pilot's typical visual field of view. That is, −90° to +90° horizontally and −20° to +20° vertically relative to the aircraft's lateral and longitudinal axes, respectively.

Figure 3A:
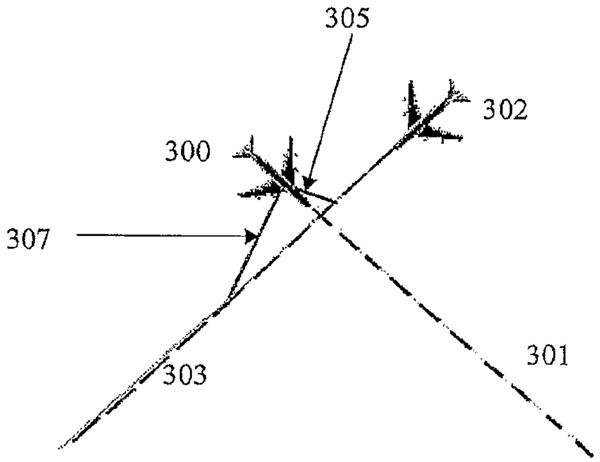
FIGS. 3*a* to 3*b* depict the conflict situation of FIGS. 2*a* to 2*d* after a certain amount of time has elapsed and the potential conflict situation between the two aircraft is closer.
Figure 3B:
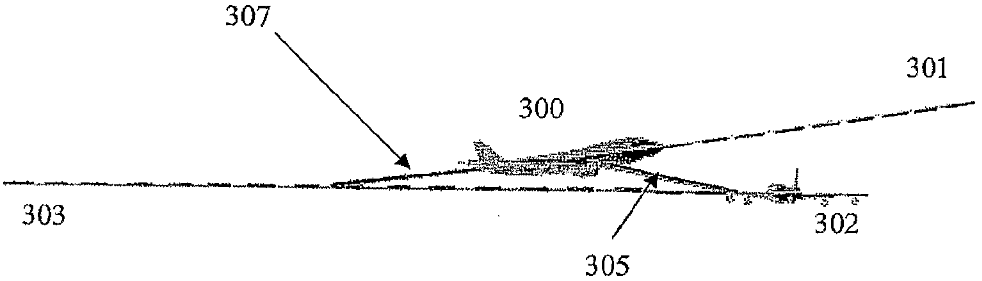

FIG. 3*a* is a further top view of the situation described above in relation to FIG. 2, after a certain amount of time has elapsed and the potential conflict situation between own-aircraft 300 and an intruder 302 is closer. In similar regard to FIGS. 2*a* and 2*b*, dashed lines 301 and 303 show the direction of the current velocity vector of own-aircraft 300, and intruder 302 respectively. Lines 305 and 307 emanating from own-aircraft show the directions that would lead to conflict. As can be seen in FIG. 3*b*, own-aircraft 300 has taken an evasive manoeuvre to climb.

Figure 3C:
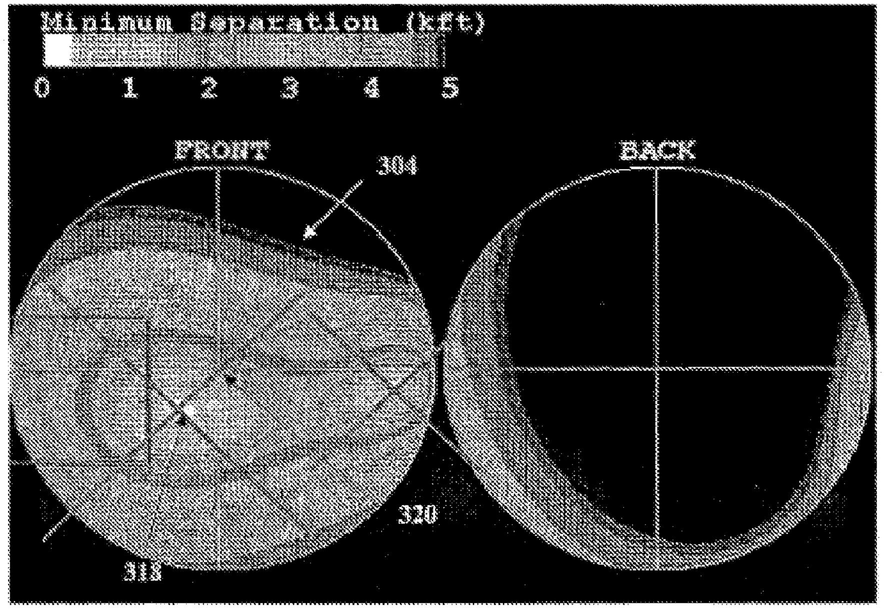
FIGS. 3*c* and 3*d* show a display in accordance with the present invention of the potential conflict situation of FIGS. 3*a* and 3*b*.
Figure 3D:
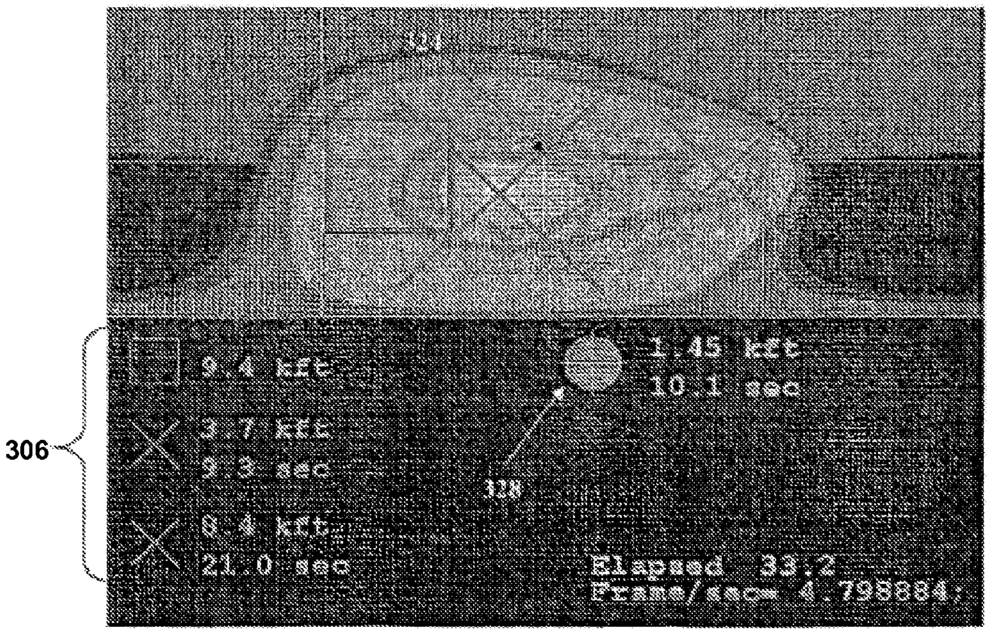

The size of the conflict zone 304 on the display in FIG. 3*c* has increased in size in comparison to FIG. 2*c* to create a greater visual impression of danger as is appropriate. This also conveys the information that own-aircraft's safe steering directions are more extreme and require urgent action.

An alternative display is shown in FIG. 3*d* depicting a Mercator projection of the whole sphere. In this embodiment, data information 306 is shown at the bottom of the display, giving accurate information to the pilot of the vehicle regarding the potential collision point.

As the situation continues, own-aircraft continues to climb to avoid the collision point. The skilled person will appreciate that the crosshairs of the zenithal projection of FIG. 3*c*, and the Mercator projection shown in FIG. 3*d* likewise move to a safer region in the conflict zone depicted by colour or shading indicating an acceptable degree of conflict.

Therefore, to summarise the situation of FIGS. 2 *a-d*, and FIGS. 3 *a-d*, own-aircraft 200 identifies the main collision point 218 nearly straight ahead. This is indicated by a bright colour/shading at own-aircraft's current heading and in the data information box at 228.

Minor drifts in direction could lead to a conflict. Therefore, own-aircraft may turn to the right, which the display supports in accordance with an acceptable degree of conflict. Were the intruder 202 to maintain its course, there is the risk from the second collision point 220 to own-aircraft's right at 70°.

Own-aircraft decides to increase the predicted vertical separation by initiating a climb, as shown in FIGS. 3*a*-3*c*. Over a period of 10 seconds own-aircraft 300 rotates upward to a 5° climb angle, and then maintains this angle. Own-aircraft 300 allows a small turn to the right at 0.15° per second. The intruder 302 does not change direction, as it is not aware of the presence of own-aircraft 300 in this instance. The main collision point 318 on the display drifts down and to the left, as desired. The projected separation measures will now increase as shown in the data information box 306. The degree of conflict is indicated by a colour/shading at own-aircraft's current direction (crosshairs 320 in FIG. 3*c*, and crosshairs 324 in FIG. 3*d*) and in the data information box at 328.

It will be appreciated that in some circumstances, such as a retreating intruder, there is no collision point. However, the conflict zone and degree of conflict may still be present, with some inner shading/colours missing.

The system of the present invention may display multiple conflict zones relating to more than one intruder. Additional conflict zones may be caused by the existence of weather or terrain. The required information is calculated as discussed below, and superimposed onto the display with their symbols (e.g. crosses and squares), conflict zones and associated degrees of conflict. Where a display pixel would have different colours or shade for two intruders (that is, the degrees of conflict varies for the same position in a conflict zone), it is preferably assigned the colour/shading of the smaller miss distance.

Figure 4:
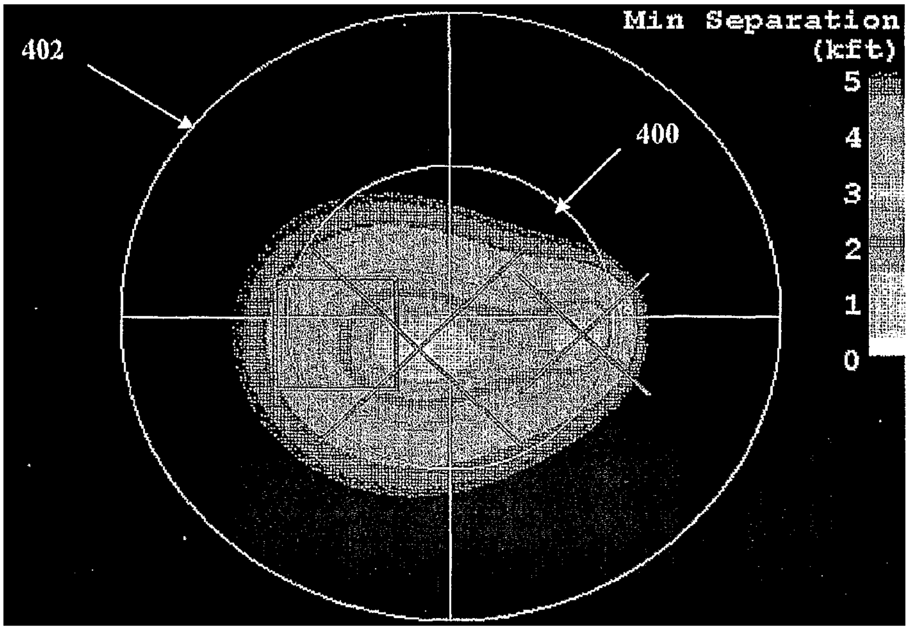
FIG. 4 is an alternative display of the potential conflict situation depicted in FIGS. 3*a* and 3*b*.

A further display embodiment is shown in FIG. 4 of the flight situation discussed above in accordance with FIGS. 3*a*-3*d*. This is a zenithal projection of the whole sphere of directions around own-aircraft. The inner disc 400 is identical to the front hemisphere zenithal projection in FIG. 3*c*, so that equal radial angles are represented as equal radial distances. However, in this projection the radial angles are continued out to 180°. The point exactly behind own-aircraft is mapped on to the outer circumference 402, so directions in this vicinity are greatly magnified and distorted.

The horizon (not shown) in this representation would form a closed curve which might be difficult to interpret. It does however have the merit of continuity of front and rear hemispheres. Preferably, the displays of the current invention may be interchanged as desired by the operator of the vehicle.

Preferably, the range of angles in any of the projections could be limited in order to show small angle changes. Additionally, the degree of conflict may be varied in accordance with the pilot's requirements, or according to an algorithm. This advantageously allows finer resolution of separations when aircraft are dangerously close, and need to manoeuvre more accurately.

Figure 5A:
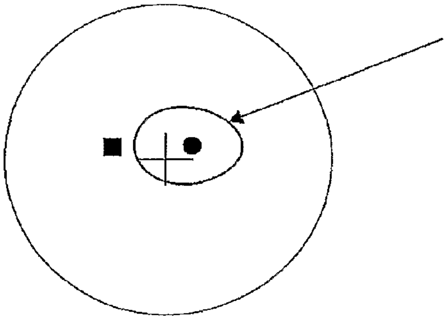
FIGS. 5*a* to 5*c* depict a monochrome display in accordance with an embodiment of the present invention.

It will be appreciated by those skilled in the art that a monochrome display may be used instead of a colour image or a varying shaded image to represent the degree of conflict. Preferably a monochrome display, such as the variations shown in FIGS. 5*a*, 5*b*, and 5*c*, will contain one or more contour lines 500 to provide an immediate indication of the degree of conflict. Each contour on the topographic-type display corresponds to a constant miss distance, hence a constant degree of conflict. Derivatives of these displays are particularly useful for inclusion in a head-up display (HUD).

Figure 6:
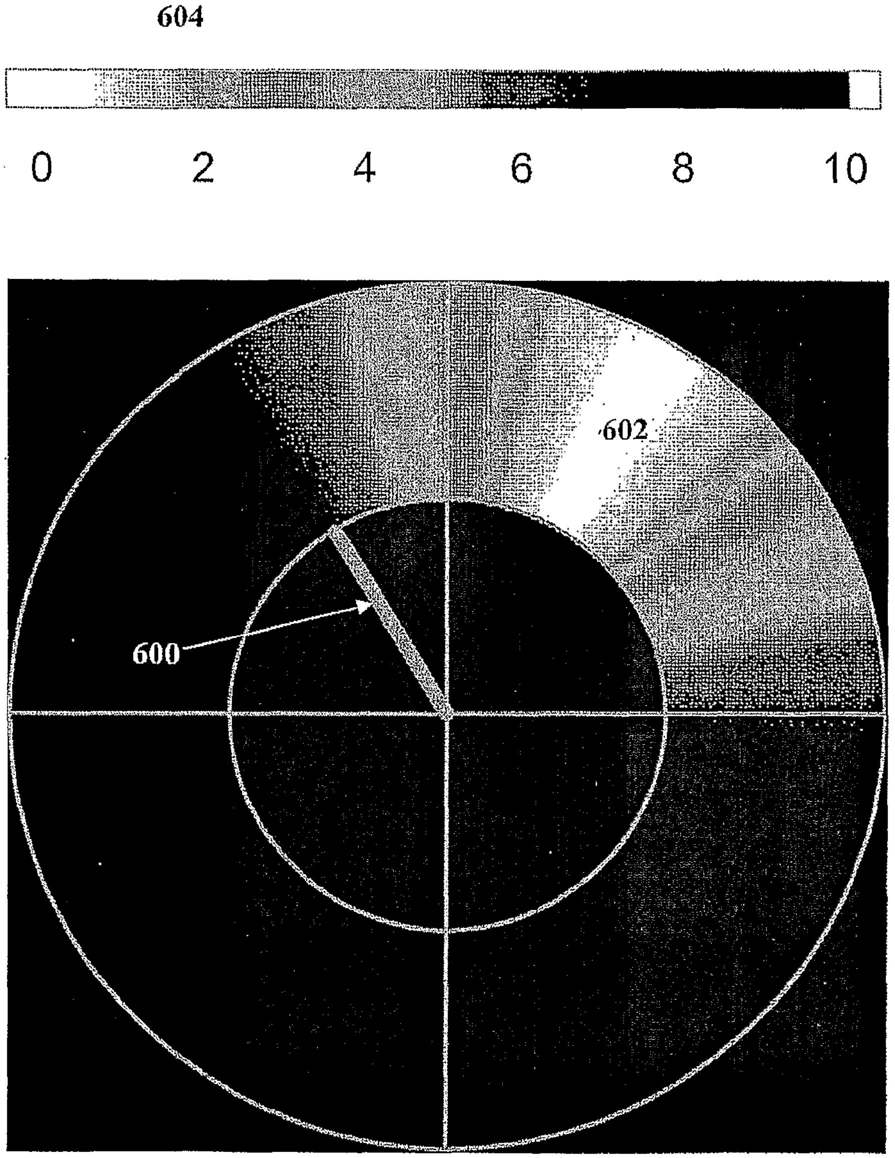
FIG. 6 is an alternative display in accordance with an embodiment of the present invention.

FIG. 6 depicts a further design in accordance with an embodiment of the present invention for a display on the instrument panel of a ship's bridge. The display is employed to immediately indicate a degree of conflict. That is, the level of danger of collision with other vessels or other obstacles such as terrain.

The display is a two-dimensional plan view. The crosshairs are aligned with ownship's axes, so that directly ahead relative to the vessel is at 12 o'clock on the display. The inner hand 600, shown in this instance at around 11 o'clock, is the current LOS of an intruder. The intruder is currently on a track that crosses in front of ownship.

The coloured or shaded bands 602 shown in the outer disc on the display indicate the varying degrees of conflict associated with the miss distance for each hypothetical velocity of ownship.

Depending on the vessel's immediate environment, a relevant scale for the degree of conflict may be selected. For example, a vessel in open sea may have a larger scale than that required for a harbour patrol vessel. The associated legend 604 preferably gives a numerical value of miss distance in relation to each degree of conflict. Miss distances can be measured from the centre point of each ship, or the dimensions and orientations of the vessel can be factored in.

The display of FIG. 6 shows that, on its current heading, ownship will miss the intruder by about 300 units. The dangerous direction for ownship is at 1 o'clock, leading to a collision point.

If the collision point is a fixed object (e.g. terrain), the degree of conflict would still be displayed in a manner in accordance with the present invention. Those skilled in the art would appreciate that an inner hand need not be present in this instance to indicate a LOS for a fixed potential collision point.

The display would preferably be augmented by numerical values (not shown), indicating time and distance to collision points. Additional intruders would be indicated by another LOS hand and another set of coloured/shaded bands. The LOS hand could be replaced by a symbol, or other obvious variant, on the perimeter.

It will be appreciated by those skilled in the art that such displays described above by way of example of an embodiment of the present invention are not limited to being located in the vehicle experiencing the potential conflict. For example, the system and method of the present invention may be implemented in an air traffic control system.

Turning now to the preferred method for calculating the degree of conflict. The following nomenclature will be used throughout the calculations discussed below.

$\mathbf{V}_F$=velocity vector of own-aircraft
$V_F$=speed of own-aircraft
$\mathbf{V}_T$=velocity vector of intruder
$V_T$=speed of intruder
$\mathbf{V}_R$=velocity vector of own-aircraft relative to intruder
$\mathbf{U}_R$=unit vector parallel to $\mathbf{V}_R$
$\mathbf{U}_{LOS}$=unit vector from own-aircraft to intruder
$R_0$=current 3D distance between own-aircraft and intruder
$R_{MD}$=3D miss distance between own-aircraft and intruder
x=coordinate parallel to $\mathbf{U}_{LOS}$
y=coordinate perpendicular to $\mathbf{U}_{LOS}$ in the plane of $\mathbf{U}_{LOS}$ and $\mathbf{V}_T$
z=coordinate perpendicular to x and y
$V_{Rx}$=x component of $\mathbf{V}_R$; similarly for $V_{Ry}$ and $V_{Rz}$.
$V_{Tx}$=x component of $\mathbf{V}_T$; similarly for $V_{Ty}$ and $V_{Tz}$
$\overline{\mathbf{V}}_F$=hypothetical velocity vector of own-aircraft
X=x component of $\overline{\mathbf{V}}_F$; similarly for Y and Z
θ=semi-angle of cone
β=tan θ
h=distance of a point from the vertex of the cone in the x direction
$h_+(\phi)$=solution of equation (12); $h_-(\phi)$ is the other solution
ϕ=polar angle of a point around the axis of the cone
CDTI=Cockpit Display for Traffic Information
LOS=Line Of Sight Values for the calculations below may be received by known methods such as radio data link transmission. Preferably, these values are calculated with the accuracy and precision of received high resolution coordinates from a Global Positioning System (GPS).

Figure 7A:
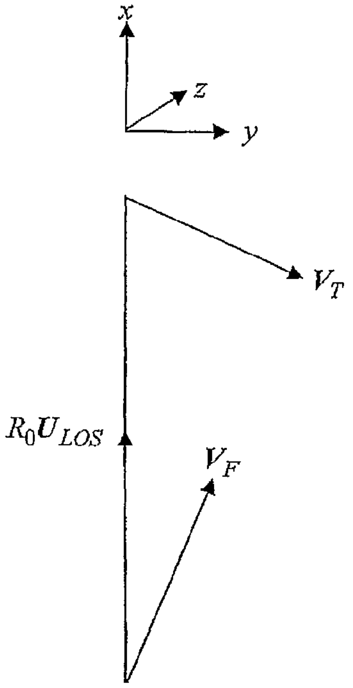
FIGS. 7*a* and 7*b* show geometry vectors for miss distance in accordance with the present invention.

With reference to the collision geometry in FIG. 7*a*, own-aircraft has 3D velocity vector $\mathbf{V}_F$, the intruder has 3D velocity vector $\mathbf{V}_T$, their current 3D distance is $R_0$ and the LOS to the intruder is given by the unit vector $\mathbf{U}_{LOS}$.

Here F is for First person and T is for inTruder or Threat or Traffic. From the point of view, or frame of reference of the intruder, own-aircraft appears to move with velocity $\mathbf{V}_R=\mathbf{V}_F-\mathbf{V}_T$ in a direction with unit vector $\mathbf{U}_R=\mathbf{V}_R/|\mathbf{V}_R|$ if $\mathbf{V}_F\neq\mathbf{V}_T$.

Figure 7B:
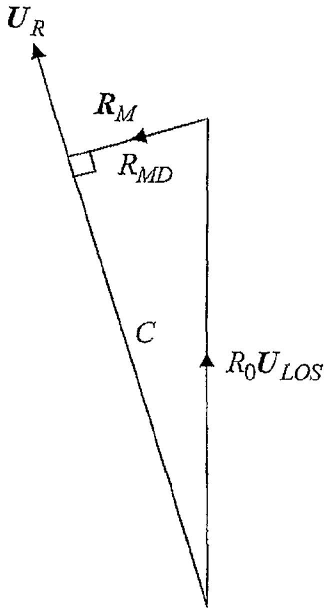

FIG. 7*b* shows that the miss distance is the shortest path from the intruder to the line through own-aircraft in the direction of $\mathbf{U}_R$. The shortest path is the perpendicular to the line. The component of the relative position vector $R_0\mathbf{U}_{LOS}$ along $\mathbf{U}_R$ is $C=R_0\mathbf{U}_{LOS}\cdot\mathbf{U}_R$, where the dot denotes the scalar product. If $\mathbf{V}_F=\mathbf{V}_T$ then C=0. Hence the vector from the intruder to own-aircraft at closest approach would be $$R_M=CU_R-R_0U_{LOS} \tag{1}$$

Pythagoras' theorem gives the miss distance as $$R_{MD}=|R_M|=\sqrt{R_0^2-C^2} \tag{2}$$

This formula is used to compute the miss distances for all hypothetical own-aircraft directions (miss points), resulting in the degree of conflict shown as the colour or shaded regions in FIGS. 2 to 6. For own-aircraft's current direction, the component $H_M$ of $R_M$ along the upward axis of own-aircraft and the component $W_M$ along its right wing are also calculated. They show how far own-aircraft will pass above and to own-aircraft's right of the intruder at closest approach, and their values are preferably given in the information data display.

Figure 8A:
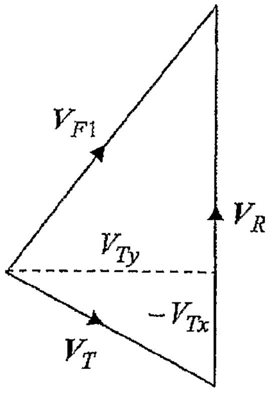
FIGS. 8*a* and 8*b* show collision geometry vectors in accordance with the present invention.
Figure 8A:
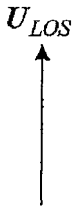

Collision points correspond to $R_{MD}$=0, which occur when $\mathbf{U}_R=\mathbf{U}_{LOS}$ as (2) shows, so that $\mathbf{U}_{LOS}$, $\mathbf{V}_F$ and $\mathbf{V}_T$ would be coplanar. Orthogonal coordinates (x,y,z) are used in which the x axis lies along $\mathbf{U}_{LOS}$ and the y axis lies in the plane of $\mathbf{U}_{LOS}$ and $\mathbf{V}_T$, so that $\mathbf{V}_T$ has a positive y component $V_{Ty}$. The z axis is defined by the right hand rule. The collision triangle shown in FIG. 8*a* shows a case where $V_F > V_T$. If $V_F < V_{Ty}$ there is no collision point. Otherwise Pythagoras' theorem gives the standard formula:

$$|V_R| = -V_{Tx} + \sqrt{V_F^2 - V_{Ty}^2} \tag{3}$$

and own-aircraft's velocity vector would be $$V_{F1} = V_T + |V_R| U_{LOS} \tag{4}$$

Figure 8B:
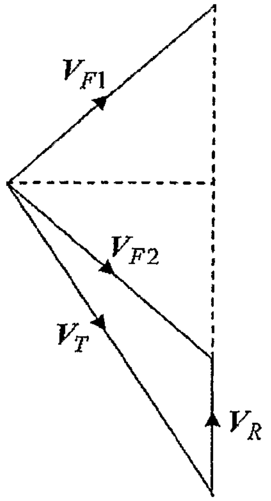

The direction of this vector is projected on the displays as a cross. FIG. 8*b* illustrates a case where $V_F < V_T$ and there are two collision directions. For the second, the plus before the square root in (3) becomes a minus. This gives a second own-aircraft velocity vector $V_{F2}$, whose direction is projected on the display as a second cross. Its parameters are preferably given against the lower cross in the information data section of the display. For own-aircraft's current velocity vector and for the collision directions, the times $C/|V_R|$ to reach minimum separation are shown in the data box.

Referring back to FIG. 5*a* a line plot version of a zenithal display is shown, where the closed curve conflict zone corresponds to a miss distance of 2000 feet. The collision point is now represented by a dot, instead of a cross. The LOS is shown as a solid square and the cross hairs are reduced. For the purposes of ease of description, both aircraft are flying level and own-aircraft has a speed of 500 ft/s. The intruder has a speed of 400 ft/s, is at a distance of 6000 feet, and is 30° to the left and 7° below own-aircraft. The intruder is crossing in front of own-aircraft at 90° to own-aircraft's path. The collision point could be reached in 10.7 seconds. However, FIG. 5*a* indicates that they will miss by about 1200 feet.

A computer program may obtain the 2000 foot contour, pixel by pixel, but this is computationally expensive and does not generate a smooth curve. Instead, an equation for the contour is obtained by referring to the collision geometry in FIG. 8*a*. Equation (2) can be written in the form $$(R_0 U_{LOS} \cdot V_R)^2 = (R_0^2 - R_M^2)|V_R|^2 \tag{5}$$

which can be expressed in components as $$(R_0^2 V_{Rx}^2 = (R_0^2 - R_{MD}^2)(V_{Rx}^2 + V_{Ry}^2 + V_{Rz}^2) \tag{6}$$

The hypothetical own-aircraft velocity is $\overline{V}_F = (X, Y, Z)$ where the components X, Y, Z are variables which will define the contour. Therefore, $$V_{Rx} = X - V_{Tx}$$

$$V_{Ry} = Y - V_{Ty}$$

$$V_{Rz} = Z \tag{7}$$

because $V_T$ has no z component. Now (6) reduces to $$\beta^2 (X - V_{Tx})^2 = (Y - V_{Ty})^2 + Z^2 \tag{8}$$

where $$\beta = \sqrt{\frac{R_{MD}^2}{R_0^2 - R_{MD}^2}} \tag{9}$$

Figure 9:
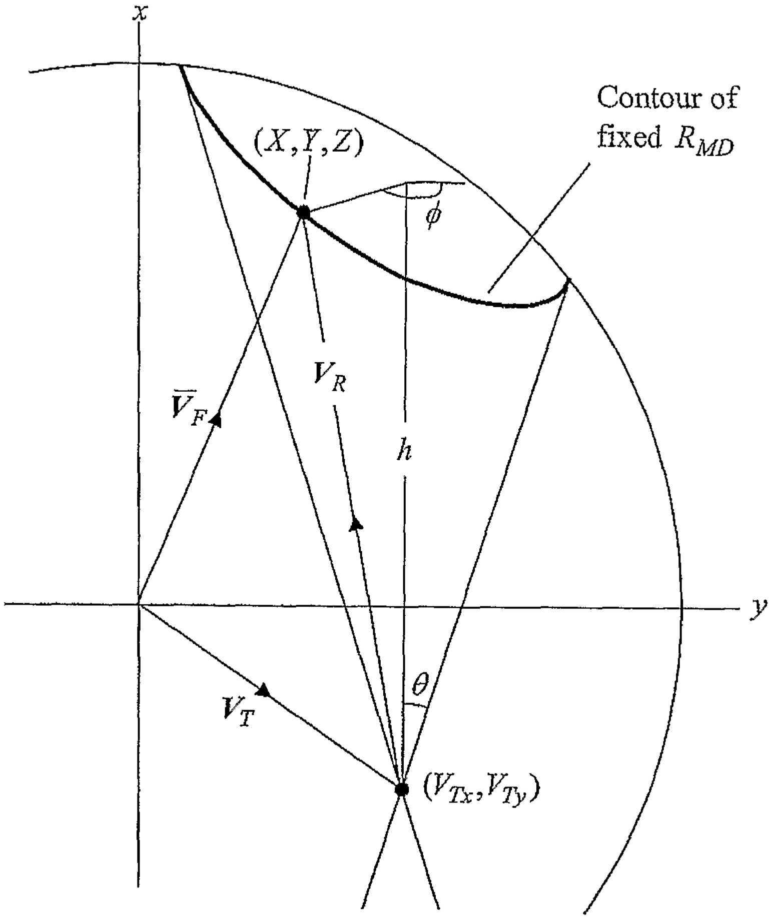
FIG. 9 shows collision projections of contours and collision points in accordance with the present invention.

Equation (8) defines a cone with vertex $V_T$, axis along the x axis, and semi-angle $\theta = \arctan \beta$. FIG. 9 shows one example. Recalling that own-aircraft's actual current speed $V_F \equiv |V_F|$ is assumed for all hypothetical own-aircraft directions, then $$X^2 + Y^2 + Z^2 = V_F^2 \tag{10}$$

This defines the surface of a sphere of radius $V_F$, centred at the origin, as illustrated in FIG. 9. The simultaneous equations (8) and (10) define two closed curves, where the cone intersects the sphere. The hypothetical own-aircraft velocities $\overline{V}_F = (X, Y, Z)$ then lie on the curves of FIG. 9. Also, the collision points lie at the intersection of the axis of the cone with the surface of the sphere, because $\beta = 0$ when $R_{MD} = 0$. The $\overline{V}_F$'s have directions given by the unit vector $\overline{U}_F = \overline{V}_F / V_F$. To plot the projections of the $\overline{U}_F$'s in FIG. 9, (8) is written parametric form $$X - V_{Tx} = h$$

$$Y - V_{Ty} = h\beta \cos \phi$$

$$Z = h\beta \sin \phi \tag{11}$$

where h is the vertical distance above the vertex of the cone and $\phi$ is the polar angle around the axis of the cone in FIG. 9. Substituting this in (10), gives the quadratic equation for h $$h^2(1+\beta^2) + 2h(V_{TX} + V_{Ty}\beta \cos \phi) + (V_T^2 - V_F^2) = 0 \tag{12}$$

The two solutions are denoted $h_+(\phi)$ and $h_-(\phi)$. When $h_+(\phi)$ is substituted in (11), the equation of the upper curve in FIG. 9 is expressed in terms of the single parameter $\phi$. The curve can then be generated from (11) by stepping through closely spaced values of $\phi$ in the range $(0, 2\pi)$. The directions $\overline{U}_F$ are then projected zenithally to produce the display of FIG. 5*a*.

A lower curve in FIG. 9 could be obtained from $h_-(\phi)$ in a similar way. However, the lower half of the cone corresponds to a minimum separation occurring in the past, so it is not physically relevant.

Figure 10A:
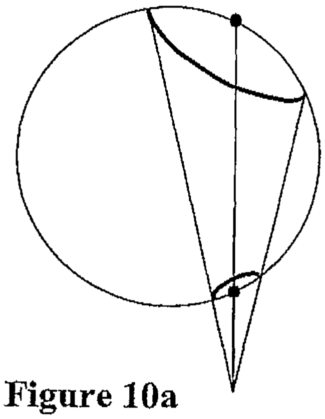
FIGS. 10*a* to 10*d* show further projections of contours and collision points calculated in accordance with the present invention.

Considering a scenario as depicted in FIG. 10*a* however, both curves lie on the upper half of the cone, and occur in the future. The resulting projection produces two contours as shown in FIG. 5*c*.

Figure 10B:
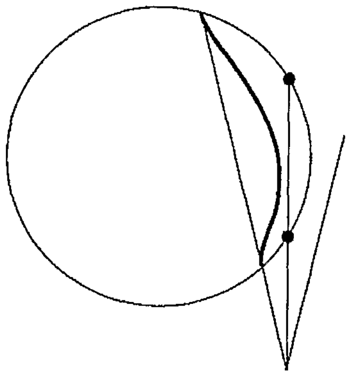
Figure 10C:
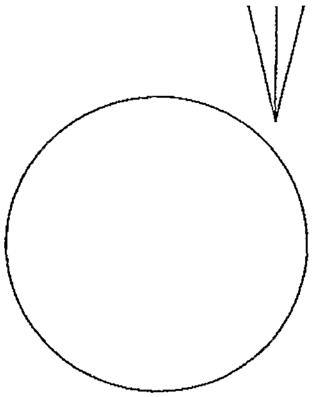
Figure 10D:
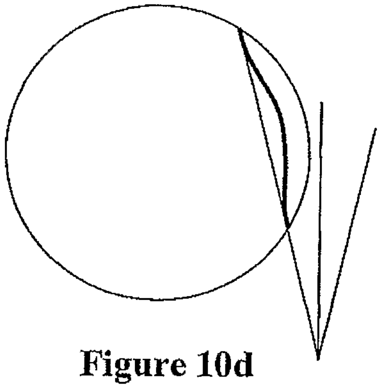

The possible situations are as follows. If own-aircraft is faster ($V_F \geq V_T$), there is exactly one collision point. This follows, because the vertex of the cone is inside the sphere in FIG. 9. If own-aircraft is slower ($V_F < V_T$), then the vertex is outside the sphere and there are two main cases:

(i). If $V_{Tx} > 0$ there is no collision point, because the vertex of the cone lies above the sphere (see FIG. 10*c*). If $V_{Tx} < 0$ and $V_{Ty} > V_F$ there is no collision point, because the vertex of the cone lies to the side of the sphere (see FIG. 10*d*). In both cases, if $V_T$ is large enough, there is no conflict zone (contour) either.

(ii). If $V_{Tx} < 0$ and $V_{Ty} < V_F$ there are two conflict points, as the vertex of the cone lies below the sphere (see FIGS. 10*a* and 10*b*). There is always at least one contour. A single contour, which could be dumbbell shaped, can enclose both collision points (see FIG. 10*b*) resulting in a conflict zone. Alternatively, two separate contours can each contain one collision point (see FIG. 10*a*). Unless $V_F \ll V_T$, one collision point is much closer and has a much larger contour. Mathematical conditions for the different types of contours can be deduced from these figures.

Figure 5B:
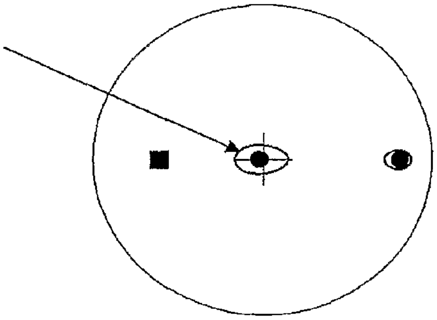
Figure 5C:
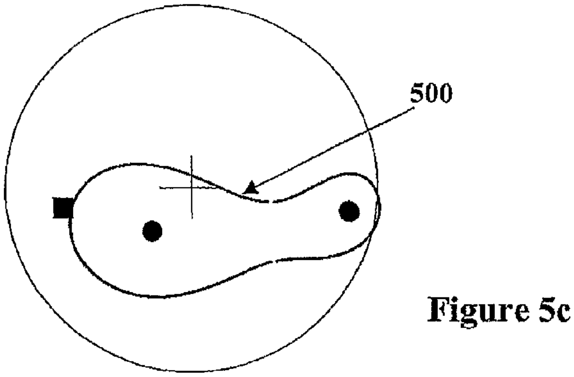

By way of example, FIG. 5*b* shows the contours from FIG. 2, whereas FIG. 5*c* shows the contours from FIG. 3 or 4. FIG. 5*c* is an example like FIG. 10*b*. These line plot displays could be used to resolve the conflict as described above, though the visual information is less complete. Preferably, many miss distances are calculated to give a beneficial indication of a degree of conflict.

It will be appreciated that vertical dimensions of aircraft are relatively small and vertical manoeuvres are required operationally for aircraft. Therefore, it might be more convenient to have a finer scale in the vertical direction. This would possibly result in a vertical colour legend and a horizontal colour legend. A horizontal miss distance of a, say, appears on the same contour (same colour/shading) as a vertical miss distance of b, say, where the ratio b/a is a fixed number less than one, based on dimensions and manoeuvrability of the vehicle. For an angle ϕ relative to the horizontal in the stereo plot, a suitable value of miss distance is $$\sqrt{a^2\cos^2\phi+b^2\sin^2\phi} \tag{13}$$

This miss distance may be found as a point on the display, along the radius at angle ϕ, and a contour drawn through that point, or colours/shades the pixel with the associated colour/shading. The resulting display then gives a finer resolution of vertical miss distances allowing a more accurate measure of a degree of conflict.

It will be appreciated by those skilled in the art that the above calculations are not limited to single-plane vehicle conditions (i.e. constant direction). Further derivation of coordinate points can result in the hypothetical calculation of the intruding vehicle banking (turning), or altering speed, and the probable degree of conflict that such manoeuvres would cause own-aircraft. For example, a hypothetical conflict in minimal time could be calculated, to inform the pilot of own-aircraft of a possible imminent conflict if the intruder turns in a dangerous way.

It will of course be realised that whilst the above has been given by way of an illustrative example of this invention, all such and other modifications and variations hereto, as would be apparent to persons skilled in the art, are deemed to fall within the broad scope and ambit of this invention as set forth in the following claims.

The claims defining the invention are as follows:

1. A method of identifying manoeuvres for a vehicle in conflict situations involving the vehicle and at least one other object, the method comprising:

for given vehicle and other object conditions, calculating a plurality of miss points at which the vehicle will miss an impact with the at least one other object by a range of miss distances, each range of miss distances representative of a range of respective future minimum separations between the vehicle and the at least one other object for possible vehicle directions;

for the given vehicle and object conditions, calculating the location of at least one collision point at which the vehicle will impact the other object;

displaying in a directional view display the miss points such that a plurality of miss points at which the vehicle would miss impact by a given miss distance indicative of a given degree of potential conflict is visually distinguishable from other miss points at which the vehicle would miss impact by greater miss distances indicative of a lesser degree of potential conflict; and displaying the at least one collision point in the directional view display;

whereby the directional view display indicates varying degrees of potential conflict indicative of respective risks of collision to thereby present a range of available manoeuvres for the vehicle and the risk of collision associated with each available manoeuvre.

2. The method according to claim 1 wherein the visually distinguishable pluralities of miss points are characterised by isometric mappings.

3. The method according to claim 2 wherein the visually distinguishable pluralities of miss points are characterised by colour bandings.

4. The method according to claim 1 wherein the plurality of miss points are calculated by high resolution coordinates.

5. The method according to claim 1 and further comprising:

repeating the steps defined in claim 1, whereby the displayed range of available manoeuvres is updated in accordance with changes to the conditions of the vehicle and the at least one other object.

6. The method according to claim 1 wherein the directional view display is a monochrome display.

7. The method according to claim 1 wherein the directional view display is a colour display.

8. A system for identifying manoeuvres for a vehicle in conflict situations involving the vehicle and at least one other object, the system comprising:

for given vehicle and other object conditions, means for calculating a plurality of miss points at which the vehicle will miss an impact with the at least one other object by a range of miss distances, each range of miss distances representative of a range of future minimum separations between the vehicle and the at least one other object for possible vehicle directions;

for the given vehicle and object conditions, means for calculating the location of at least one collision point at which the vehicle will impact the other object; and a directional view display;

whereby the directional view display is configured to display the miss points such that a plurality of miss points at which the vehicle would miss impact by a given miss distance indicative of a given degree of potential conflict is visually distinguishable from other miss points at which the vehicle would miss impact by greater miss distances indicative of a lesser degree of potential conflict; and whereby the directional view display is configured to display the at least one collision point in the directional view display; and whereby the directional view display indicates varying degrees of potential conflict indicative of respective risks of collision to thereby present a range of available manoeuvres for the vehicle and the risk of collision associated with each available manoeuvre.

9. The system according to claim 8 wherein the visually distinguishable pluralities of miss points are characterised by isometric mappings.

10. The system according to claim 9 wherein the visually distinguishable pluralities of miss points are characterised by colour bandings.

11. The system according to claim 8 wherein the plurality of miss points are calculated by high resolution coordinates.

12. The system according to claim 8 and further comprising:

repeating the calculations defined in claim 8, whereby the displayed range of available manoeuvres is updated in accordance with changes to the conditions of the vehicle and the at least one other object.

13. The system according to claim 12 wherein the directional view display is a monochrome display.

14. The system according to claim 12 wherein the directional view display is a colour display.

15. The system according to claim 1 further comprising means for calculating numerical indications of the time and distance of the vehicle from the at least one collision point;

whereby the directional view display is configured to display the numerical indications of the time and distance of the vehicle from the at least one collision point.

16. The method according to claim 1,
whereby the vehicle is a first aircraft, and
whereby the object is a second aircraft.

17. The method according to claim 16 further comprising the step of selecting a manoeuvre to avoid a mid-air collision between the first aircraft and the second aircraft based on the varying degrees of potential conflict displayed on the directional view display.

18. The system according to claim 8 wherein the vehicle is a vessel.

19. The system according to claim 18 further comprising the step of selecting a manoeuvre to avoid collision between the vessel and the object based on the varying degrees of potential conflict displayed on the directional view display.

20. The method according to claim 1 further comprising the step of selecting a maneuver for intercepting the object based on the varying degrees of potential conflict displayed on the directional view display.

21. A non-transitory computer readable medium comprising computer executable instructions for identifying manoeuvres for a vehicle in conflict situations involving the vehicle and at least one other object, the instructions comprising:

for given vehicle and object conditions, calculating a plurality of miss points at which the vehicle will miss an impact with the at least one other object by a range of miss distances, each range of miss distances representative of a range of future minimum separations between the vehicle and the at least one other object for possible vehicle directions;

for the given vehicle and object conditions, calculating the location of at least one collision point at which the vehicle will impact the other object;

displaying in a directional view display the miss points such that a plurality of miss points at which the vehicle would miss impact by a given miss distance indicative of a given degree of potential conflict is visually distinguishable from other miss points at which the vehicle would miss impact by greater miss distances indicative of a lesser degree of potential conflict; and displaying the at least one collision point in the directional view display;

whereby the directional view display indicates varying degrees of potential conflict indicative of respective risks of collision to thereby present a range of available manoeuvres for the vehicle and the risk of collision associated with each available manoeuvre.

* * * * *